(12) United States Patent
Merkel et al.

(10) Patent No.: US 8,832,237 B2
(45) Date of Patent: Sep. 9, 2014

(54) METHOD FOR OFFLINE SERVICING OF A FIELD DEVICE OF AUTOMATION TECHNOLOGY

(75) Inventors: Jan Merkel, Mutterstadt (DE); Immanuel Vetter, Sinzheim (DE)

(73) Assignee: CodeWrights GmbH, Karlsruhe (DE)

( * ) Notice: Subject to any disclaimer, the term of this patent is extended or adjusted under 35 U.S.C. 154(b) by 355 days.

(21) Appl. No.: 12/963,815

(22) Filed: Dec. 9, 2010

(65) Prior Publication Data
US 2011/0153786 A1    Jun. 23, 2011

(30) Foreign Application Priority Data
Dec. 17, 2009 (DE) .......... 10 2009 054 901

(51) Int. Cl.
*G06F 15/177* (2006.01)

(52) U.S. Cl.
USPC .......................................................... 709/220

(58) Field of Classification Search
USPC ................................................. 709/220–222
See application file for complete search history.

(56) References Cited

U.S. PATENT DOCUMENTS

| | | | |
|---|---|---|---|
| 2005/0021705 A1 | 1/2005 | Jurisch | |
| 2007/0213846 A1* | 9/2007 | Da Silva Neto | ................ 700/19 |
| 2008/0228957 A1* | 9/2008 | Meyer et al. | .................... 710/19 |
| 2008/0256174 A1* | 10/2008 | Toivonen | ...................... 709/203 |
| 2008/0281298 A1* | 11/2008 | Andersen et al. | .......... 604/891.1 |
| 2008/0312757 A9* | 12/2008 | Nixon et al. | .................... 700/83 |
| 2009/0164293 A1* | 6/2009 | Coley | ................................ 705/9 |
| 2009/0276486 A1* | 11/2009 | Tandon et al. | ................ 709/203 |
| 2009/0292996 A1* | 11/2009 | Anne et al. | .................... 715/736 |
| 2011/0004685 A1* | 1/2011 | De Groot et al. | ............. 709/225 |

FOREIGN PATENT DOCUMENTS

| | | |
|---|---|---|
| DE | 101 51 116 A1 | 5/2003 |
| DE | 10 2008 014 153 A1 | 10/2008 |
| DE | 10 2007 059 671 | 6/2009 |
| WO | WO2009/074544 A1 | 6/2009 |

\* cited by examiner

*Primary Examiner* — Jason Recek
(74) *Attorney, Agent, or Firm* — Bacon & Thomas, PLLC

(57) ABSTRACT

A method for offline servicing of a field device (FD) of automation technology by means of a service unit (SU), wherein a web server is associated with the field device (FD) and a web browser is associated with the service unit (SU), wherein the method has the following steps: the service unit (SU) connects via the web browser with the web server of the field device (FD) to be serviced; a control logic (CL) made available by the web server is loaded into the web browser; the control logic (CL) starts the download of offline web pages, which are present in the web server or are produced by it, and loads the web pages and the configuration data of the field device (FD) into the service unit (SU); and the current configuration data are, with involvement of the web pages and the loaded configuration data, edited or created offline in the service unit (SU).

10 Claims, 3 Drawing Sheets

METHOD FOR OFFLINE SERVICING OF A FIELD DEVICE OF AUTOMATION TECHNOLOGY

TECHNICAL FIELD

The invention relates to a method for offline servicing of a field device of automation technology by means of a service unit, wherein a web server is associated with the field device and wherein a web browser is associated with the service unit.

BACKGROUND DISCUSSION

In process—and manufacturing automation technology, field devices are often applied, which serve to register and/or influence process variables. Serving for registering process variables are measuring devices, such as, for example, fill-level measuring devices, flow measuring devices, pressure and temperature measuring devices, pH measuring devices, electrical conductivity measuring devices, etc., which register the corresponding process variables of fill-level, flow, pressure, temperature, pH-value and conductivity. Serving for influencing process variables are actuators, for example valves or pumps, via which the flow of a fluid in a section of pipeline or the fill-level in a container can be changed. Under the term "field devices" as used in connection with the invention are thus subsumed all types of measuring devices and actuators.

Also referred to as field devices, moreover, are in connection with the invention, all devices which are employed near the process and which deliver, or process, process-relevant information. In addition to the aforementioned sensors and actuators, generally, such units that are directly connected to a fieldbus and which serve for communication with the superordinated units, for example remote I/Os, gateways, linking devices and wireless adapters or radio adapters, are also referred to as field devices. A plurality of these devices are produced and sold by the Endress+Hauser Group.

In modern industrial plants, communication between at least one superordinated control unit and the field devices occurs, as a rule, via a bus system, such as, for example, Profibus®, Foundation® Fieldbus or HART®. The bus systems can be embodied both in a hardwired manner as well as wirelessly. The superordinated control unit serves for process control, for process visualizing, for process monitoring as well as for starting up and servicing the field devices, and is also referred to as the configuration/management system.

The integration of field devices in configuration or management systems occurs via device descriptions, which assure that the superordinated control units can detect and interpret the data delivered by the field devices. The device descriptions for each field device type, or for each field device type in different applications, are provided, as a rule, by the respective device manufacturer. So that the field devices can be integrated into different fieldbus systems, different device descriptions must be created for the different fieldbus systems. Thus, there are—to name only a few examples—HART, Fieldbus Foundation and Profibus device descriptions. The number of device descriptions is very large and corresponds to the large number of different field devices and field device types in the different applications and bus systems.

For the purpose of creating a unitary description language for field devices, the Fieldbus Foundation (FF), the HART Communication Foundation (HCF) and the Profibus Nutzerorganisation (Profibus User Organization, referred to as the 'PNO') have created a unified electronic device description language (Electronic Device Description Language: EDDL). The EDDL and the corresponding Electronic Device Description EDD are defined in the standard IEC 61804-2.

Ever more important in automation technology is industrial Ethernet. Examples of industrial Ethernets are: HSE, ControlNet, Industrial IP, Profi-Net, HART UDP/TCP, . . . field devices, which are connected via an industrial Ethernet with a superordinated control unit, and which also usually make use of a web server. This web server enables servicing, and, thus, especially, configuration, parametering or diagnosis of a field device, by means of a web browser. In principle, servicing of field devices is only possible online, via a service unit connected or connectable with the field device. Up to now, no method has been known by which a field device can be serviced offline, that is to say without being integrated into the industrial Ethernet.

SUMMARY OF THE INVENTION

An object of the invention is to service offline a field device which, in the online case, is integrated into an industrial Ethernet.

The object is achieved by a method having the following steps: the service unit connects via the web browser with the web server of the field device to be serviced; a control logic provided by the web server is loaded into the web browser; the control logic starts download of offline web pages, which are present in the web server or produced by it, and loads the web pages and configuration data of the field device into the service unit; the current configuration data are, with involvement of the web pages and the loaded configuration data, edited or created offline in the service unit.

The control logic is preferably a script executable by the web browser or a program startable in the browser, and embodied, for example, as a plug-in or an applet, e.g. a Java applet. Alternatively, the control logic can be embodied as a stand-alone program. A further development of the method of the invention especially provides that the control logic can also independently validate the configuration data.

In summary, it can be said that, additionally, web resources for offline servicing (web pages) are stored in the field device. Under the term "servicing" are subsumed, in such case, among other things, parametering, configuring, and diagnosis, but also archiving or validation of exchanged data. The data or the data sets are locally stored on the service unit, e.g. through use of Java applets. The offline servicing of the field device or the field devices then occurs by means of the service unit. The offline servicing is independent of the particular field device. Especially, the web resources, here especially the web server, provide up/download functions for the configuration data. As soon as the servicing device is connected with the field device to be serviced, the web resources thus enable at least the exchange of information contained in the data sets.

In an advantageous further development of the method of the invention, it is provided that the created, current configuration data are made available for the purpose of transmission to the field device, as soon as the field device is connected online with the service unit.

A preferred embodiment of the method of the invention provides that the created, current configuration data are compared with "old" configuration data present in the field device.

Moreover, it is provided that, with the assistance of the web pages, individual configuration data are synchronized between the data set in the service unit and the corresponding data set in the field device. This is important, since an offline change of the data set in the servicing device does not instantaneously also result in a corresponding change of the data stored in the field device.

Considered as especially advantageous is the embodiment of the method of the invention, wherein the configuration data for each individual field device are managed independently of one another within the service unit, so that a plurality of field devices can simultaneously be serviced offline.

For this, it is especially provided that the field-device-specific repositing of the configuration data is implemented by inclusion of a unique device designation in file or path names.

It is furthermore seen as advantageous when offline data sets are transmitted to a field device when this is connected to the fieldbus. Offline data sets are data sets which, for example, are delivered by another field device. To name an example: In a fill-level measuring device to be replaced, data are contained which contain information concerning the geometry of the container in which the measuring device is installed. These data are transmitted from the fill-level measuring device to be replaced to the replacement device.

In this connection, it is provided that the configuration data of the offline data sets are checked as regards their compatibility by means of a logical unit, which is implemented in the field device or in the service unit. In the case of an incompatibility of the offline data sets, means are offered for manual synchronization.

It is seen as especially advantageous in connection with the method of the invention when, in the field device, a device driver is integrated, which triggers transmitting of the created, current configuration data into the service unit as soon as the field device is switched online.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
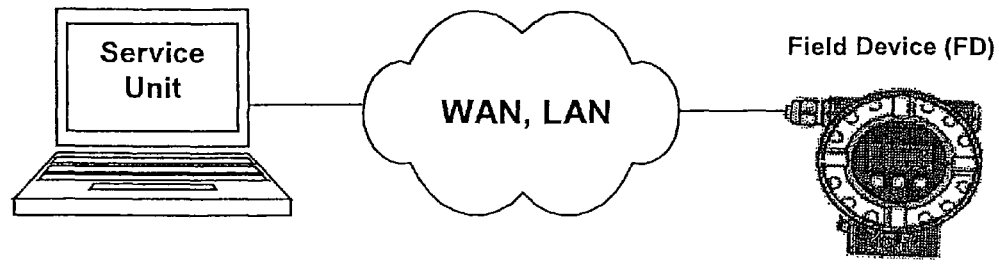
FIG. 1 is a schematic representation of the hardware components which serve to perform the method of the invention.

FIG. 1 shows a schematic representation of hardware components required for performing the method of the invention: a service unit SU and a field device FD. As communications medium, a network WAN, LAN is used, which takes the form of a company-internal network or the Internet. As already described at length, especially an industrial Ethernet is used. The communication occurs wirelessly or in a hard-wired manner.

Figure 2:
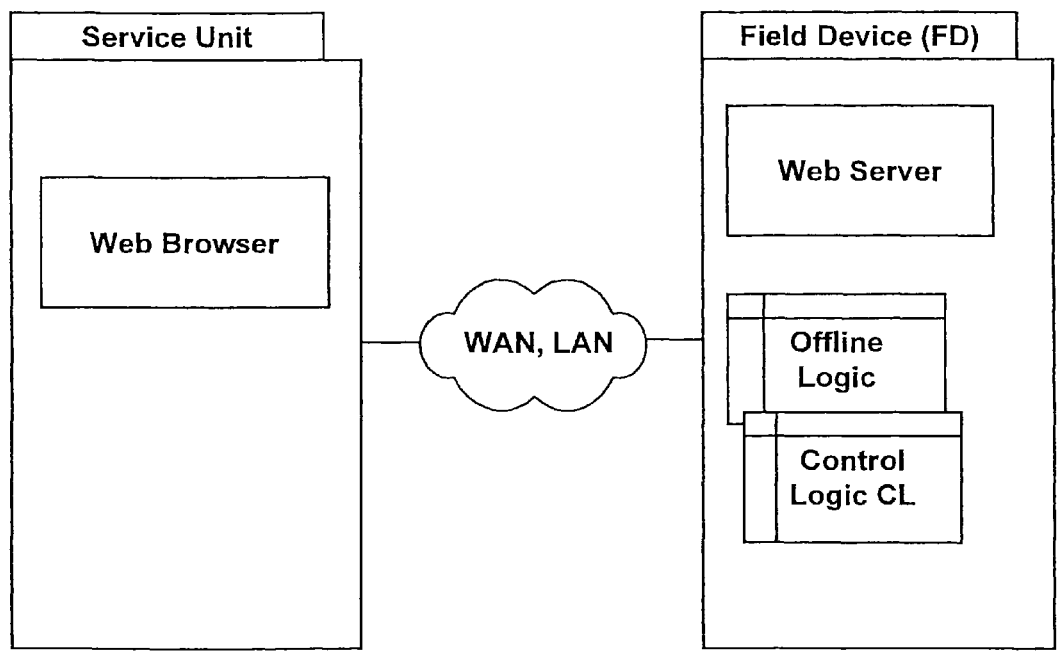
FIG. 2 is a schematic representation, which shows an embodiment of the method of the invention during establishment of connections.
Figure 3:
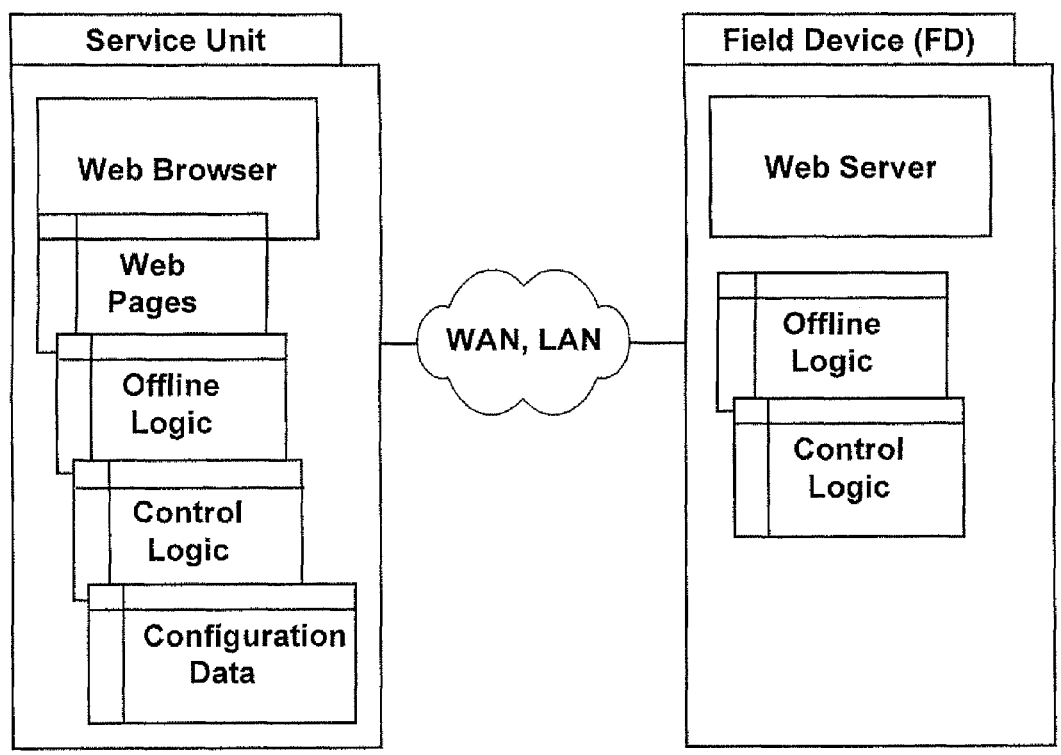
FIG. 3 is a schematic representation, which illustrates the embodiment shown in FIG. 2 after setup of the offline servicing.

FIG. 2 shows, schematically presented, which software components are available to the field device FD and to the service unit SU during establishment of connections for the offline servicing. FIG. 3 shows the corresponding software components and their association with the servicing device SU and the field device FD after setup of the offline servicing.

During the establishment of connections, with which the method for offline servicing of the field device FD of automation technology by means of the service unit SU is started, a web server is integrated into the field device FD and a web browser into the service unit SU. In general, these fall under the heading, 'web resources'. Furthermore, present in the field device FD are an offline logic and a control logic CL. According to the invention, the service unit SU connects via the web browser with the web server of the field device FD to be serviced. This procedure is controlled via the control logic. The control logic CL made available by the web server is then loaded into the web browser. Following this, the control logic CL starts the download of offline web pages, which are present in the web server or are produced by the web server. These web pages and the respective configuration data of the field device FD are loaded into the service unit SU. The current configuration data are, with the involvement of the web pages and the loaded configuration data, edited—thus changed—or newly created, offline in the service unit SU.

Figure 4:
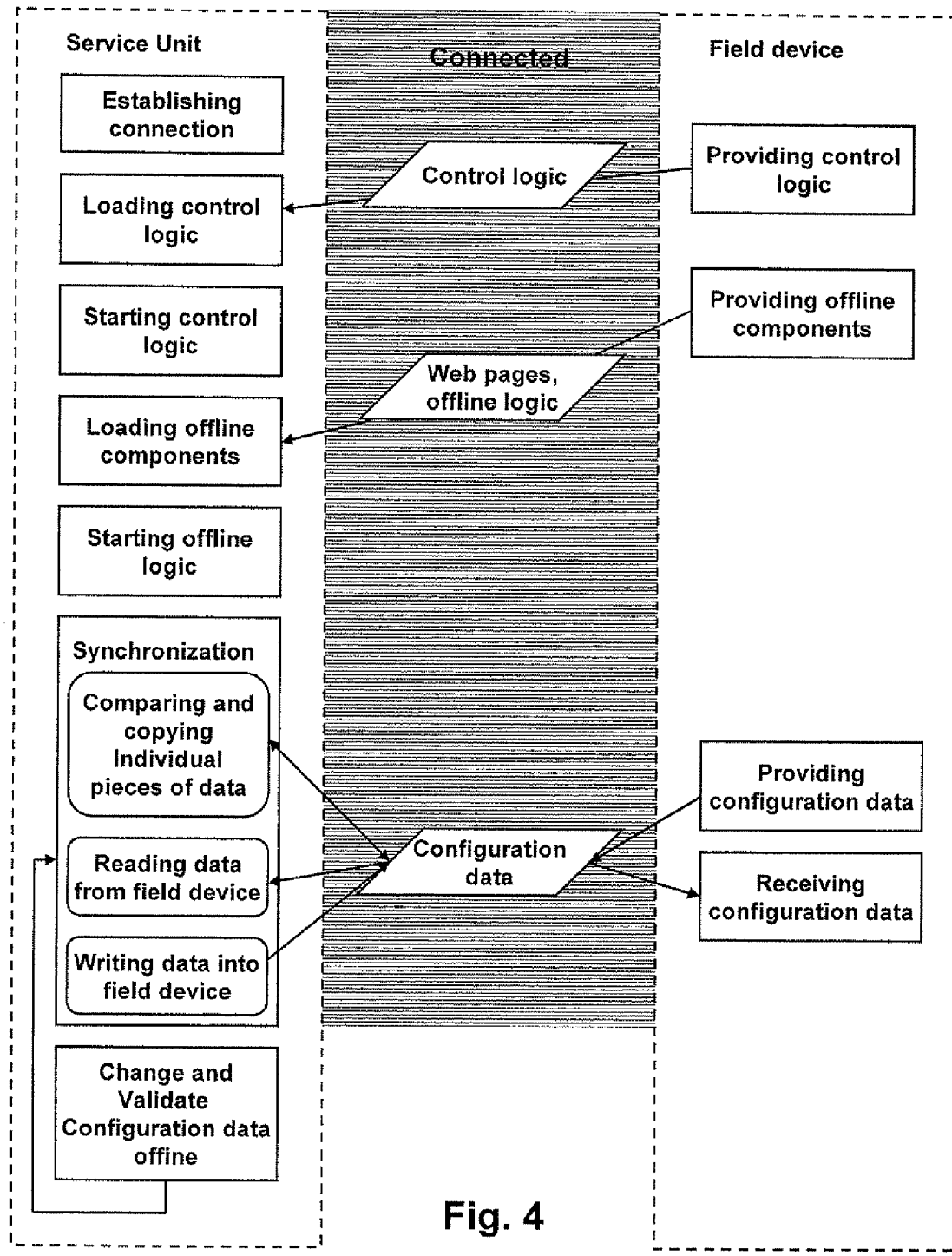
FIG. 4 is a flow diagram, which describes an embodiment of the method of the invention.

FIG. 4 shows a flow diagram which describes an advantageous embodiment of the method of the invention. In the left region are presented the program steps which run in the service unit SU; in the right region are seen the program steps which are executed by the field device FD. Communication between the field device FD and the service unit SU occurs via any suitable communications medium.

After establishment of connections with the field device FD, the control logic CL is loaded via the offline logic from the field device FD to the service unit SU. The control logic CL is then started in the service unit SU. The web server in the field device FD makes available the offline components—the offline logic and the web pages are transmitted over the communications medium CM—and the offline components are loaded into the service unit SU. Following this, the offline logic is started. The main function of the offline logic is the validation of the transmitted data or data sets. The offline logic especially checks whether the data or data sets are self-consistent.

The configuration data to be edited, provided by the field device FD via the web pages, are, after their transmission over the communications medium CM, synchronized with the current offline configuration data in the servicing device SU. For this, the configuration data are compared, and individual changed configuration data are copied into the web pages. The configuration data (changed web pages??) are read from the field device FD, in given cases changed, and then written back to the field device FD. The data are thus changed, validated and subsequently synchronized again. The changed data are then transmitted via the communications medium of the service unit SU to the field device FD. This transmission can naturally only occur when the field device FD is back online.

The invention claimed is:

1. A method for offline servicing of a field device (FD) of automation technology by means of a service unit (SU), wherein a web server, an offline logic and a control logic (CL) are integrated into the field device (FD) and a web browser is associated with the service unit (SU), the method comprising the steps of:

connecting the service unit (SU) via the web browser with the web server of the field device (FD);

loading the control logic (CL) via the offline logic from the field device (FD) to the service unit (SU);

starting the control logic (CL) in the service unit and the control logic (CL) starts download of offline web pages which are present in the web server or are produced by it, and loads the web pages and configuration data of the field device (FD) into the service unit (SU); and with involvement of the web pages and the configuration data, current configuration data are created or edited offline in the service unit (SU).

2. The method as claimed in claim 1, wherein:
the current configuration data are available for transmission to the field device as soon as the field device (FD) is connected online with the service unit (SU).

3. The method as claimed in claim 1, wherein:
the current configuration data are compared with the configuration data present in the field device (FD).

4. The method as claimed in claim 1, wherein:
with assistance of the web pages, individual configuration data are synchronized between a data set in the service unit (SU) and a corresponding data set in the field device (FD).

5. The method as claimed in claim 1, wherein:
the configuration data for multiple field devices (FD1, FD2, . . . ) are managed independently within the service unit (SU), so that a plurality of field, devices (FD1, FD2, . . . ) can be serviced simultaneously offline.

6. The method as claimed in claim 5, wherein:
field-device-specific repositing of the configuration data is implemented by inclusion of a unique device designation in file or path names.

7. The method as claimed in claim 1, wherein:
offline data sets are transmitted to a field device (FD) connected to a fieldbus (FB).

8. The method as claimed in claim 7, wherein:
offline data sets are checked as regards compatibility by means of a logic unit, which is implemented in the field device (FD) or in the service unit (SU).

9. The method as claimed in claim 8, wherein:
in case of an incompatibility of the offline data sets, means for manual synchronization are offered.

10. The method as claimed in claim 1, wherein:
in the field device (FD), a device driver (DTM) is integrated, which triggers transmitting of the current configuration data into the service unit (SU).

* * * * *